United States Patent [19]

Graham et al.

[11] Patent Number: 5,751,879
[45] Date of Patent: May 12, 1998

[54] WOUND OPTICAL FIBER CABLE INCLUDING ROBUST COMPONENT CABLE(S) AND A SYSTEM FOR MANUFACTURE OF THE CABLE

[75] Inventors: Lionell Graham, Norcross; Artis Cornell Jenkins, Lithonia; Terry Don Mathis; Wayne McCall Newton, both of Lilburn; Montri Viriyayuthakorn, Norcross, all of Ga.

[73] Assignee: Lucent Technologies Inc., Murray Hill, N.J.

[21] Appl. No.: 580,229

[22] Filed: Dec. 28, 1995

[51] Int. Cl.$^6$ ............................................ G02B 6/44
[52] U.S. Cl. ............................ 385/103; 174/107
[58] Field of Search ............................ 174/34, 36, 107, 174/109; 385/100, 103, 104, 105, 107, 109, 111, 113

[56] References Cited

U.S. PATENT DOCUMENTS

| | | | |
|---|---|---|---|
| 5,148,509 | 9/1992 | Kannabiran | 385/113 X |
| 5,345,526 | 9/1994 | Blew | 385/100 X |
| 5,469,523 | 11/1995 | Blew et al. | 385/101 |
| 5,542,020 | 7/1996 | Horska | 385/100 |

*Primary Examiner*—Akm E. Ullah

[57] ABSTRACT

An optical fiber cable includes one or more component cables. In one embodiment, the component cable has an elongated central aramid yarn member surrounded by at least one, and preferably six, optical fibers. An aramid yarn layer surrounds and contacts the optical fibers, and a plastic jacket envelopes and contacts the aramid yarn layer. In a second embodiment, the component cable includes optical fibers, preferably twelve in number, embedded in aramid fibers. A plastic jacket in contact with the aramid fibers, encloses the aramid fibers with its embedded optical fibers. In the cable of this invention, component cables of the first and/or second embodiments are wound about an elongated, central strength member with a reverse-oscillated lay. An outer jacket encloses and holds the reverse-oscillated lay of the component cables. The invention also includes a system for manufacturing the cables of this invention.

28 Claims, 11 Drawing Sheets

WOUND OPTICAL FIBER CABLE INCLUDING ROBUST COMPONENT CABLE (S) AND A SYSTEM FOR MANUFACTURE OF THE CABLE

BACKGROUND OF THE INVENTION

1. Field of the Invention

This invention is directed to an optical fiber cable that includes a plurality of component optical fiber cables. Each component optical fiber cable is itself sufficiently robust to be a stand-alone cable for many applications including for use as a riser cable in a building. Each component optical fiber cable includes several, preferably six or twelve, optical fibers so that, when several component cables are assembled in the optical fiber cable, the optical fiber cable has a relatively high fiber count.

2. Description of the Related Art

FIG. 1 is a cross-sectional view of a prior art optical fiber cable 1. The prior art cable 1 has several grouped optical fiber units 2. Each unit 2 has a central fiber-glass rod 3 about which is disposed several buffered optical fibers 4 embedded in aramid yarn 5. To distinguish the units 2 from each other, a binding tape 6 with a color uniquely identifying each unit 2 is loosely wrapped about the aramid yarn 5. The binding tape 6 can be a colored fabric ribbon or a thermoplastically-formed tape helically wrapped on the unit 2. A Mylar™ wrapping tape 7 is wrapped about the yarn 5 to hold the rod 3, buffered fibers 4, yarn 5 and binding tape 6 together in each of the units 2. Several units 2 are helically wound together, bundled with ripcords 8 and wrapped with Mylar™ wrapping tape 9 which holds the bundled units 2 and ripcords 8 together. A plastic jacket 10 encloses the wrapping tape 9 and forms the outside of the prior art cable 1.

The prior art cable 1 has several significant disadvantages. For example, when separating the buffered optical fibers 4 from a unit 2, the fiber-glass rod 3 becomes exposed. Not only are operations such as optical fiber splicing encumbered by the presence of the fiberglass rods 3, but the rods 3 also pose a significant danger to a person installing or servicing the prior art cable 1 who, if not careful, can puncture a hand or arm on a glass rod 3. This danger is especially acute if the rods 3 have been broken in the process of stripping out the buffered fibers 4 from a unit 2 because the broken end of the rod 3 tends to be extremely sharp. Also, to establish optical signal transmission between the prior art cable 1 and a location remote from the prior art cable 1, buffered fibers 4 must be spliced to the optical fibers of other, generally smaller cables with ratings appropriate for the particular application. Because splicing is a relatively difficult operation, it would be desirable if a simple, effective technique could be used to run the buffered optical fibers from a cable to a remote location. Moreover, because the colored binding tape 6, in one embodiment of the prior art cable 1, is helically wrapped, the tape 6 constricts upon the unit 2 as the tape 6 cools, so much so that the buffered optical fibers 4 can be damaged by the constricting tape 6. In addition, if the tape 6 is a fabric ribbon material loosely wrapped about the unit 2 as used in another embodiment of the prior art cable 1, the tape 6 tends to become unwrapped from a unit 2 when the wrapping tape 9 and jacket 10 are stripped from the prior art cable 1. Therefore, the ribbon-version of the tape 6 is of limited use in distinguishing one unit 2 from another. Another disadvantage of the prior art cable 1 is that the aramid yarn 5 is of a relatively fine Denier and is extremely subject to static electricity, thus tending to obscure visibility and impede handling of the units 2 and/or buffered optical fibers 4. Further, the unit 2 of the prior art cable 1 has very little protection once the unit 2 is broken out from the jacket 10, and thus can be easily damaged. Moreover, the helical wrapping of the units 2 in the prior art cable 1 requires relatively expensive planetary feed equipment to manufacture the prior art cable 1.

SUMMARY OF THE INVENTION

This invention overcomes the disadvantages noted hereinabove. According to a first preferred embodiment of the invention, an optical fiber cable includes at least one, and preferably more than one, component optical fiber cable(s). In one embodiment, each component cable(s) includes an elongated central aramid yarn member that is surrounded and contacted by a plurality of buffered optical fibers, preferably six in number. An aramid yarn layer surrounds and contacts the buffered optical fibers, and a plastic jacket surrounds and contacts the aramid yarn layer. The plastic jacket can be formed with a color pigment that distinguishes the component cable from others. In the optical fiber cable, one or more component cables are wound, preferably with a reverse-oscillated lay, about and in contact with an elongated central strength member. The cable also includes an outer jacket surrounding and in contact with the component cables. When the number of component cables to be used in the cable are less than the number of component cables needed to entirely surround the strength member, one or more spacers, essentially extruded plastic tubes, can be disposed between the component cables so that the cable has a regular, uniform shape, and so that each component cable is fixed in position in the cable between other component cable(s) and/or spacer(s), the strength member and the outer jacket. Also, for ease in stripping and/or to increase the flexibility of the cable, a slick substance such as talc powder can be applied to the component cables and the inside surface of the outer jacket so that friction is minimized between the outside of the component cable(s) and the inside of the outer jacket.

In the second embodiment of the invention, the component cable(s) includes a plurality of buffered optical fibers, preferably twelve in number, and aramid yarn which surrounds and contacts the buffered optical fibers. A plastic jacket surrounds and contacts the aramid yarn in the component cable(s) of the second embodiment of this invention. In other respects, the second embodiment of the cable is similar to the first embodiment of the cable.

Advantageously, the component cables of either the first or second embodiments of this invention are sufficiently robust to be used as stand-alone cables. Thus, the component cables can be stripped out from the main cable and run to remote locations without need of the difficult task of splicing the main cable to another smaller cable as required in the prior art. Also, the main and component cables can be made for a wide variety of applications such as for use as riser-, non-halogen or plenum-rated cables. Moreover, because the component cables are wrapped on the strength member with a reverse-oscillated lay, an expensive planetary cable pay-off system as used in the prior art, is not needed to manufacture the cables of this invention. In addition, the cables of this invention are preferably standardized in arrangement of the component cable(s) or spacer(s) and standardized in dimension, and yet the number of optical fibers can be varied within a wide range by selecting component cables with relatively high or low fiber counts, and by using or omitting spacer(s) from the cable. Therefore, the cables of this invention can be readily modified to meet a customer's requirements without the need to significantly change or modify the equipment used to manufacture the cables of this invention.

This invention also includes a system for manufacturing an optical fiber cable. In a preferred embodiment, the system includes a reverse-oscillated lay (ROL) machine which receives the strength member and at least one component cable preferably in accordance with either the first or second embodiments of the cable of this invention. The ROL machine has a plurality of plates arranged at intervals along a path along which the component cable(s) are advanced. The plates have respective apertures through which component cable(s) advance, and rotate in an oscillatory manner in a phase relationship that causes the component cable(s) to twist about the strength member with a reverse-oscillated lay. The phrase 'reverse-oscillated lay' means that, along the length of the cables the component cables are twisted in alternate directions about the strength member. In other words, along the length of the cable, the component cables are twisted about the strength member for a predetermined number of turns in one direction, and then for a predetermined number of turns in the opposite direction, the alternate twisting being continued along the length of the cable. The ROL machine plate from which the twisted component cables are output from the ROL machine is termed the 'exit plate'. From the exit plate, the component cables and strength member advance through an applicator containing a slick substance such as powdered talc. In the applicator, the slick substance is applied to the outer surfaces of the component cables. On the side of the applicator opposite the side which receives the twisted component cables and strength member from the ROL machine's exit plate, a follower plate is situated. The follower plate defines apertures which receive the advancing component cables and the strength member. The follower plate apertures correspond with the apertures in the exit plate, and the follower plate rotates in an oscillatory manner in phase with the exit plate to hold the reverse-oscillated lay of the component cables. From the follower plate, the component cables advance to a sizing die which defines a constrictive aperture which forces the component cables into close proximity, and preferably in contact, with the strength member. To hold the reverse-oscillated lay of the component cables as they are advanced for extrusion of the outer jacket over the component cables, at least one pair of rollers is arranged adjacent the sizing die. The rollers have opposing circumferential convex surfaces arranged in opposition Between the rollers, the ROL component cables advance. The convex roller surfaces enclose the component cables so that friction between the convex roller surfaces and the component cables prevent the component cables from untwisting, and thus prevent the loss of the reverse-oscillated lay of the component cables on the strength member.

Because the system of this invention includes a ROL machine, expensive planetary feed machines required in the prior art, are not needed to manufacture the cables of this invention. Also, the use of the follower plate oscillating in phase with the exit plate of the ROL machine, prevents untwisting of the component cables during application of the slick substance in the applicator. Further, the rollers prevent the ROL of the component cables from untwisting before the outer jacket is extruded to hold the component cables in their ROL arrangement.

These together with other objects and advantages, which will become subsequently apparent, reside in the details of construction and operation as more fully hereinafter described and claimed, reference being had to the accompanying drawings, forming a part hereof, wherein like numerals refer to like parts throughout.

BRIEF DESCRIPTION OF THE DRAWINGS

The present invention can be better understood with reference to the following drawings. The drawings are not necessarily to scale, emphasis instead being placed on clearly illustrating the principles of the invention.

DESCRIPTION OF THE PREFERRED EMBODIMENTS

Figure 2A:
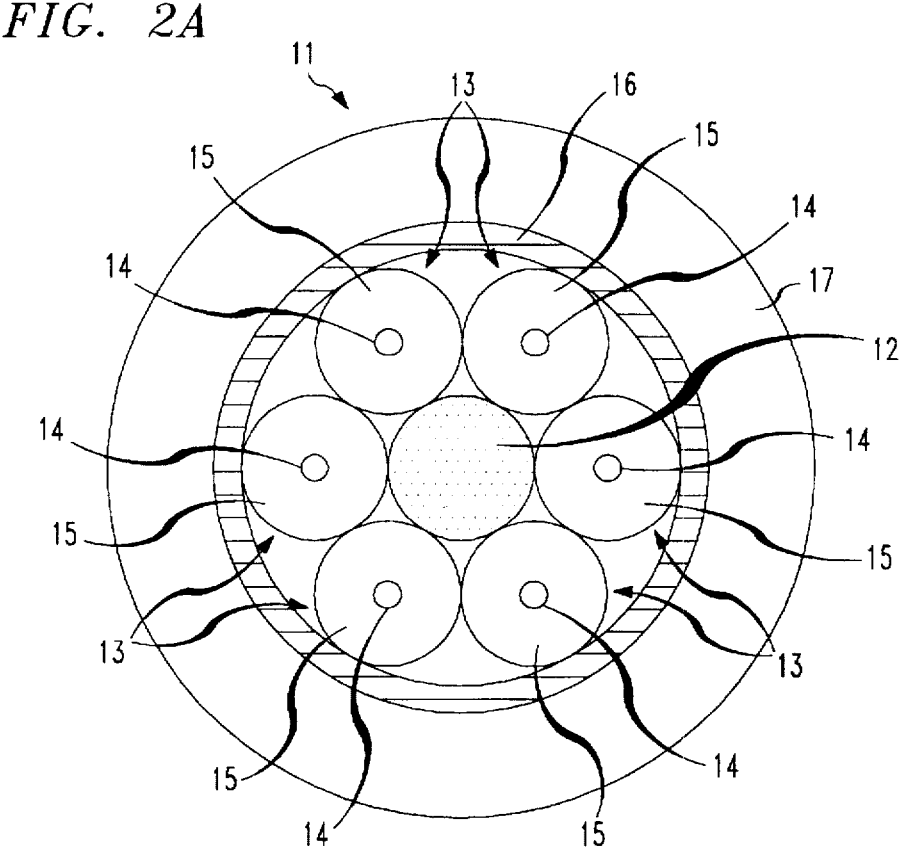
FIG. 2A is a cross-sectional view of a component cable in accordance with a first embodiment of this invention.

In FIG. 2A, a component optical fiber cable 11 is shown in cross-section. The component cable 11 is the basic unit used to manufacture larger cables in accordance with this invention, as will be described later in this document. The component cable 11 includes an elongated, central aramid yarn member 12. Preferably, the yarn member 12 is composed of 4×2160 denier Kevlar™, although aramid yarn of other numbers of yarn strands, denier or composition types can be used. Surrounding and in contact with the yarn member 12 is at least one, and preferably six, buffered optical fibers 13. Each buffered optical fiber 13 includes an optical fiber 14 surrounded and contacted by a buffer layer 15 preferably formed of one or more layers of plastic material such as nylon, polypropylene or polyvinyl chloride (PVC). In preferred sizes, the diameter of each buffered optical fiber 13 is 0.035 inches to comply with U.S. standards, or is 0.020 inches to comply with standards in countries such as Japan, for example. Of course, other sizes of the buffered optical fibers 13 can be used without the departing from the scope of this invention.

The buffered fibers 13 can be arranged about the yarn member 13 with respective longitudinal axes parallel to that of the yarn member 12. Preferably, however, the buffered optical fibers 13 are helically-wound, or wound with a reverse-oscillated lay, about the yarn member 12. The term 'reverse-oscillated lay', known to those of ordinary skill in this art, means that the buffered optical fibers 13 are wrapped about the yarn member 12 in alternating directions along the longitudinal axis of the yarn member 12. The winding of the buffered optical fibers 13, either helically or in reverse-oscillated lay, about the yarn member 12 ensures that no one buffered optical fiber 13 is subjected to extreme amounts of tension or compression which could damage the optical fibers 14 when the component cable 11 is bent.

An aramid yarn layer 16 is wrapped about the buffered optical fibers 13. Preferably, the yarn layer 16 is formed of 8×2160 denier Kevlar™, although other numbers of aramid yarn strands, denier or composition types for the yarn may be used in the yarn layer 16 without departing from the scope of this invention. The aramid yarn strands of the yarn layer 16 can be disposed approximately parallel to the longitudinal axis of the yarn member 12, or can be wrapped helically or in a reverse-oscillated lay; about the buffered optical fibers 13. The buffered optical fibers 13 are thus cushioned on one side by the yarn member 12, and cushioned on a side opposite to the yarn member 12 by the yarn Layer 16. This arrangement allows for some freedom of movement of the buffered optical fibers 13 to accommodate, for example, flexing of the component cable 11, and yet the yarn member 12 and yarn layer 16 are formed of aramid materials which provide significant protection from rupture or tearing of, or from shock or impact to, the component cable 11.

A plastic jacket 17, preferably tube-like in shape, surrounds and contacts the yarn layer 16. Preferably, the plastic jacket 17 is composed of PVC, and is 0.020 inches in radial thickness. The two different radial thicknesses of the jacket 17 are used for reasons that will be explained later in this document.

Preferably, the component optical fiber cable 11 is, as shown in FIG. 2A, circular in cross-section. The component cable 11 is preferably relatively small in diameter and has a preferred diameter of 0.165 inches.

The component cable 11 can be manufactured using a conventional system as follows. The yarn member 12 and the buffered optical fibers 13 are advanced from respective spools in a conventional stationary pay-off system, for example, and the aramid yarn layer 16 is formed by drawing aramid yarn strands from respective spools in the feed system and either linearly feeding the aramid yarn strands to surround the advancing buffered optical fibers 13, wrapping the aramid yarn strands about the buffered optical fibers or helically wrapping the aramid yarn strands about the advancing buffered optical fibers using conventional devices. The yarn member 12, the buffered optical fibers 13 and the aramid yarn layer 16 are then fed to an extruder die for continuous extrusion of the plastic jacket 17 about the advancing yarn member 12, buffered optical fibers 13 and the aramid yarn layer 16, to form the component cable 11.

Figure 2B:
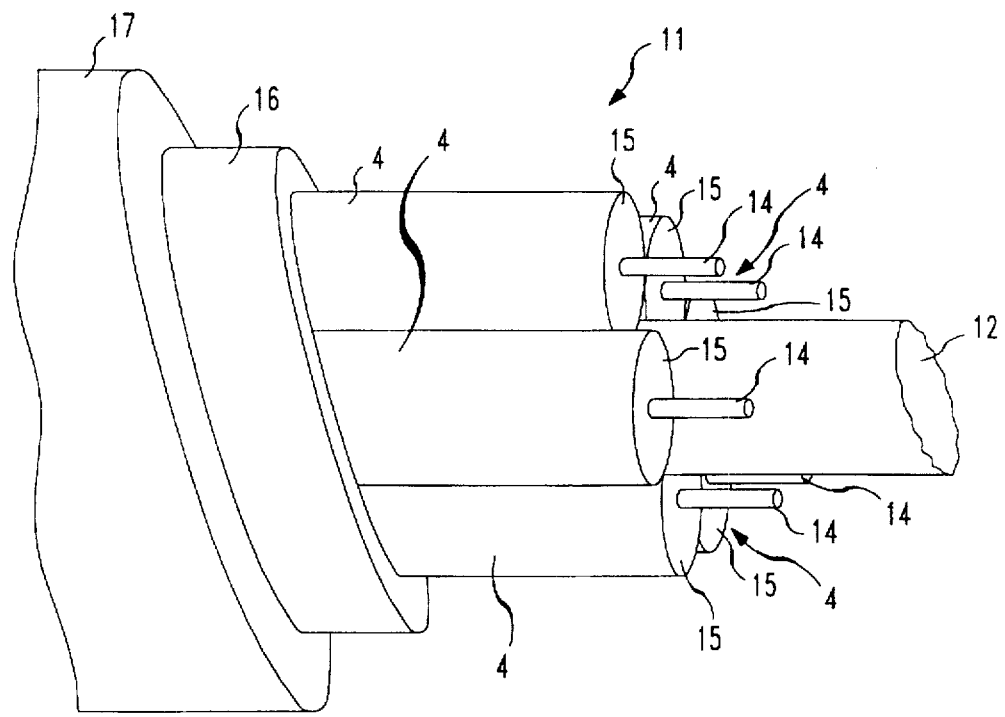
FIG. 2B is a telescoping perspective cutaway view of the component cable of FIG. 2A.

FIG. 2B is a telescoping perspective cutaway view of the component optical fiber cable 11 of FIG. 2A. FIG. 2A is provided in this document to give an appreciation of the three-dimensional configuration of the component cable 11.

Figure 3A:
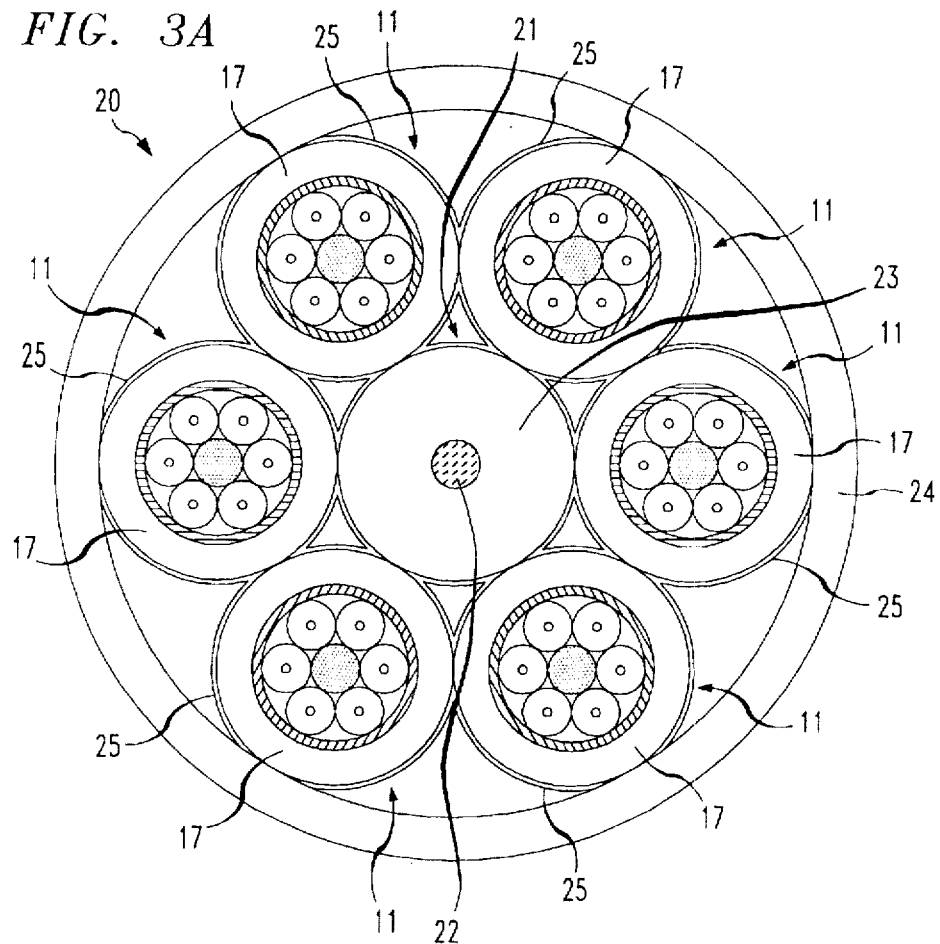
FIG. 3A is a cross-sectional view of a main cable of this invention incorporating component cables of FIGS. 2A and 2B.

The component cable 11 is a basic unit used to construct various embodiments of an optical fiber cable 20. FIG. 3A is a cross-sectional view of one such embodiment of the cable 20 in accordance with this invention. The cable 20 includes an elongated central strength member 21 which is flexible to a degree to allow the cable 20 to be flexed for winding onto or off of a drum, or for bending the cable 20 along curves in a desired installation path, and yet the strength member 21 is sufficiently resilient to prevent over-bending of the cable 20 that could damage its optical fibers. The strength member 21 has at its core a rod 22 made of a material such as fiberglass, covered by a plastic layer 23, tube-like in shape, composed of PVC, for example. The rod 22 can be fiberglass of about 0.040 inches in diameter, and the plastic layer 23 can be about 0.0625 inches in radial thickness so that the strength member 21 is about 0.165 inches in diameter. The strength member 21 preferably is circular in cross-section with a diameter that is the same or similar to that of the component cable 11. Wrapped about the central strength member 21 in reverse-oscillated lay are a plurality of component cables 11, preferably six in number, as shown in FIGS. 2A and 2B. Preferably, the strength member 21 and the component cables 11 are of approximately the same diameter so that, when wrapped about the strength member 21, each component cable 11 is contacted and thus supported by adjacent component cables 11 and the strength member 21, or at least is confined or restricted in movement to an appreciable degree, by neighboring component cables 11 as well as the strength member 21. The strength member 21 and the component cables 11 are held together and protected by an outer jacket 24, preferably tube-like in shape and formed of plastic material such as PVC. The outer jacket 24 encloses the component cables 11 and the strength member 21, and bears against the component cables 11 to a degree sufficient to hold the reverse-oscillated lay of the component cables 11 due to friction exerted on the outer surfaces of the component cables 11 between the inner surface of the jacket 24 and the outer surface of the strength member 21. In fact, the friction exerted by the inner surface of the jacket 24 on the outer surfaces of the component cables 11 can be so great as to impede the ability to strip the jacket 24 from the component cables 11. Also, friction between the inner surface of the jacket 24, the outer surfaces of the component cables 11 and the outer surface of the strength member 21 can impede the flexibility of the cable 20 by preventing movement of the jacket 24, the component cables 11 and the strength member 21 relative to one another along the longitudinal axis of the cable 20. To counteract this frictions a slick substance 25 such as powdered talc can be applied to the inner surface of the jacket 24, the outer surfaces of the component cables 11 and/or the outer surface of the strength member 21.

Preferably, the cable 20 is made so that it is relatively compact for the number of optical fibers it contains to ease handling of the cable. For example, the cable 20 can be about 0.558 inches in diameter, thus having a relatively compact size for the 36 optical fibers included in the embodiment of the cable shown in FIGS. 3A and 3B.

Figure 1:
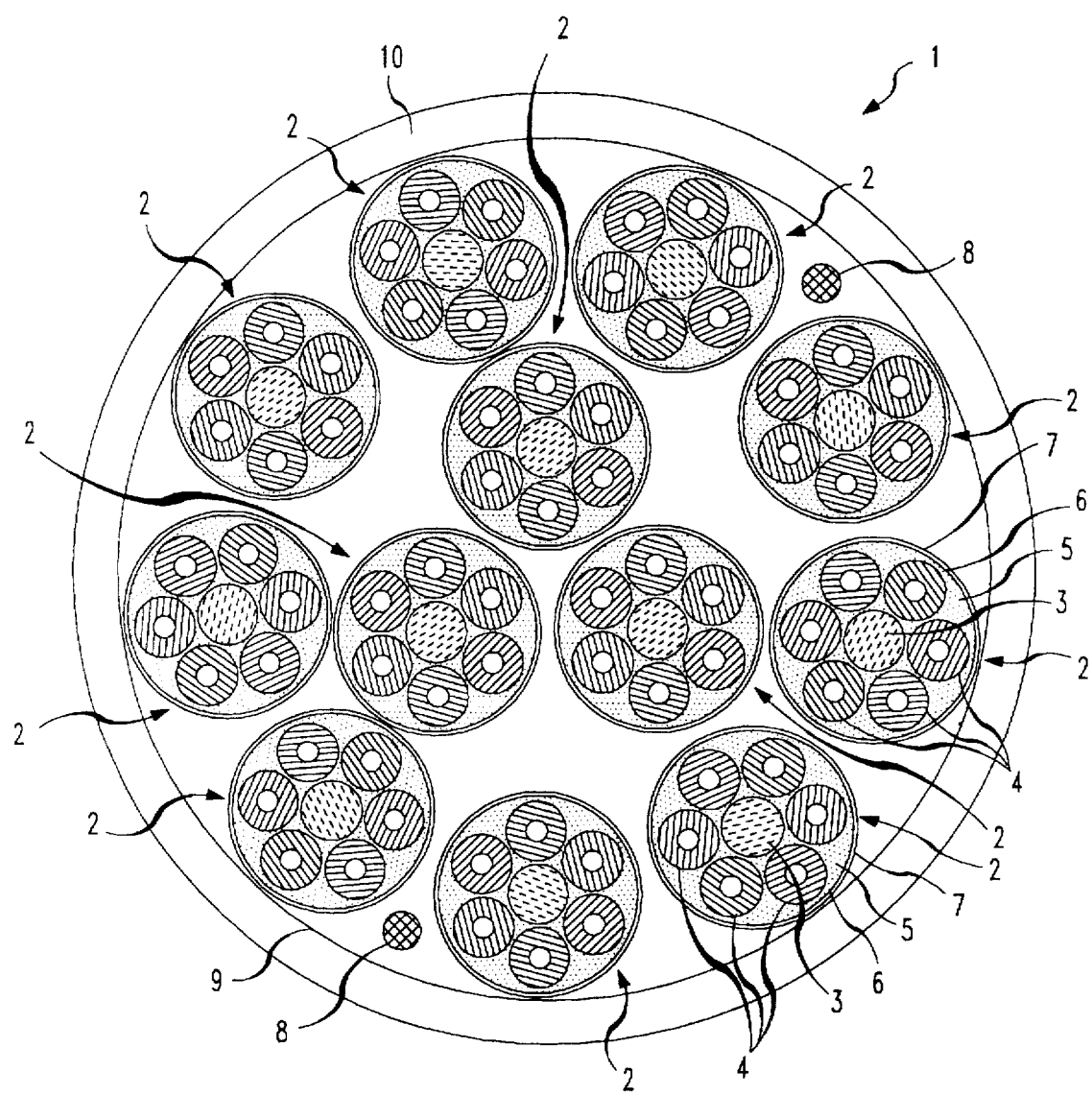
FIG. 1 is a cross-sectional view of a prior art cable.

In operation, the cable 20 can be used in a manner similar, in part, to the use of conventional optical fiber cables. More specifically, for shipment and storage after manufacture, the cable 20 can be wound on a drum or spool. During installation, the cable 20 is unwound from the drum or spool and laid along a desired route. For example, the cable 20 can be inserted and advanced into a communication conduit of a building. The ends of the component cables 11 at each end of the cable 20 are then coupled to respective communications coupling equipment or other cables, to couple central offices, networks and computer systems, for example. Unlike conventional cables, however, when installing the cable 20, the outer jacket 24 of the cable 20 can be stripped, any extraneous length of the strength member 21 can be cut and disposed of, and the cables 11 can be run to separate locations without the need to splice the component cables 11 to other cables with appropriate ratings, as required with prior art cables. In fact, the component cable 11 is itself sufficiently robust that it can serve as a stand-alone cable meeting, for example, Bellcore test specification TR-NWT-000409. In addition, if desirable for a particular application, the plastic materials used in the cable 20 (i.e., the buffers 15, the plastic jacket 17, the plastic layer 23 and the outer jacket 24) can be made of a low-smoke halogen PVC and polyvinyl diene fluoride (PVDF) to meet Underwriter's Laboratories, Inc. (UL) test specifications 910 for a plenum-rating and UL test specification 1666 for a riser rating. Thus, for example, if the component cables 11 are riser-rated, the cable 20 can be passed through floors of a building and the component cables 11 can be stripped out of the cable 20, and run to respective floors or areas within the building to serve office networks, computer systems, communication equipment and the like in the floors or areas of the building. Because the splicing of optical fiber cables required in the prior art is difficult, tedious and time-consuming, the cable 20 of this invention greatly simplifies and reduces the cost of cable installation relative to the prior art. Moreover, by eliminating or reducing the number of splicing operations needed to install an optical fiber cable, the cable 20 of this invention reduces the risk of damage to optical fibers necessarily posed by exposure of optical fibers during splicing. Also noteworthy is that, when the strength member 21 is cuts the plastic layer 23 shields a service person from the cut end of the fiberglass rod 22. Because this end can be extremely sharp and can potentially cause serious injury to a service person, the strength member 21 of this invention greatly improves the safety of a service person when working with the cable 20 of this invention, relative to prior art cables. Another advantage of this invention is that the plastic Jacket 17 of each of the component cables 11 can be pigmented with a color that distinguishes the component cable 11 from other component cables in the cable 20. The pigmentation of the component cables 11 provides an effective scheme for distinguishing the component cables 11, unlike prior art cables that use colored tape which, after outer jacket extrusion, constricts upon an unit 2 (see FIG. 1), leading to possible damage of the optical fibers in the unit 2.

Figure 3B:
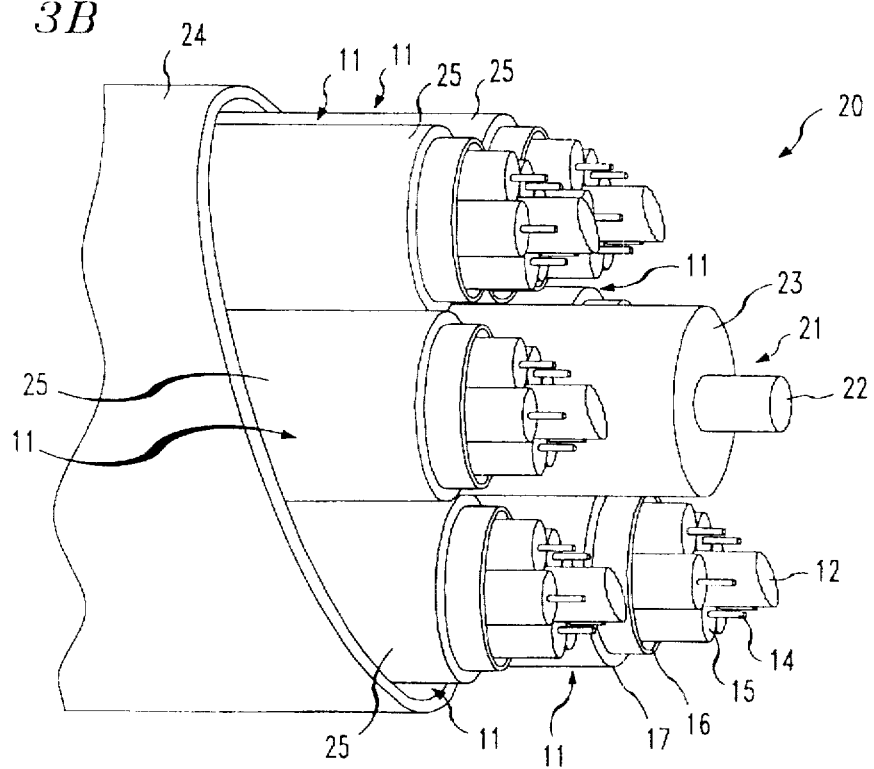
FIG. 3B is a telescoping perspective cutaway view of the main cable of FIG. 3A.

FIG. 3B is a telescoping perspective cutaway view of the cable 20 of FIG. 3A. The view of FIG. 3B is provided to give a three-dimensional appreciation of the cable 20 and the arrangement of the strength member 21, component cables 11 and the jacket 24.

Figure 4:
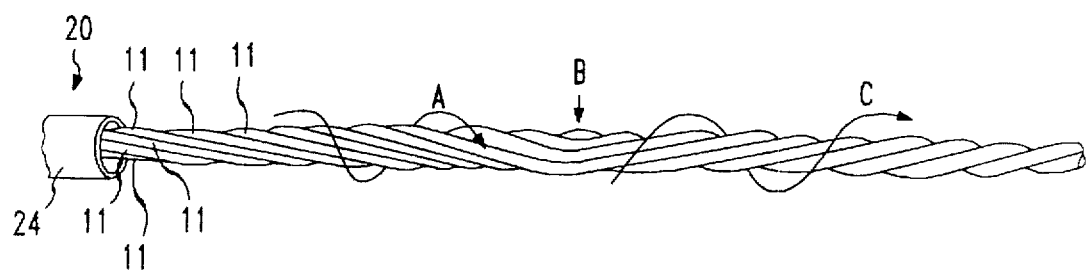
FIG. 4 is a partial cutaway view of a main cable in accordance with this invention showing component cables in reverse-oscillated lay.

FIG. 4 is a partial cutaway view of the cable 20 showing the preferred reverse-oscillated lay of the component cables 11 on the strength member 21. As shown in FIG. 4, along the length of the cable 20, the component cables 11 twist about the strength member 21 in a first rotational direction designated "A" in FIG. 4. At position "B" along the length of the cable, the twisting of the component cables 11 is reversed.

To the right of position "B" in FIG. 4, the component cables 11 twist in a direction "C" which is opposite to the direction "A". The twisting of the component cables 11 distributes the tension and compression due to flexing of the cable 20 evenly to all of the component cables 11, and thus, no one component cable 11 is subjected to extreme tension or compression when the cable 20 is bent. The reverse-oscillated lay of the component cables 11 effectively provides the desirable twisting of the component cables 11, and yet does not require a planetary, pay-off system that would be required if the component cables 11 were helically-wrapped about the strength member 21 along the full length or a significant length of the cable 20. Thus, the cable 20 of this invention does not require the relatively expensive planetary equipment required for the manufacture of helically-wrapped cables.

Figure 5A:
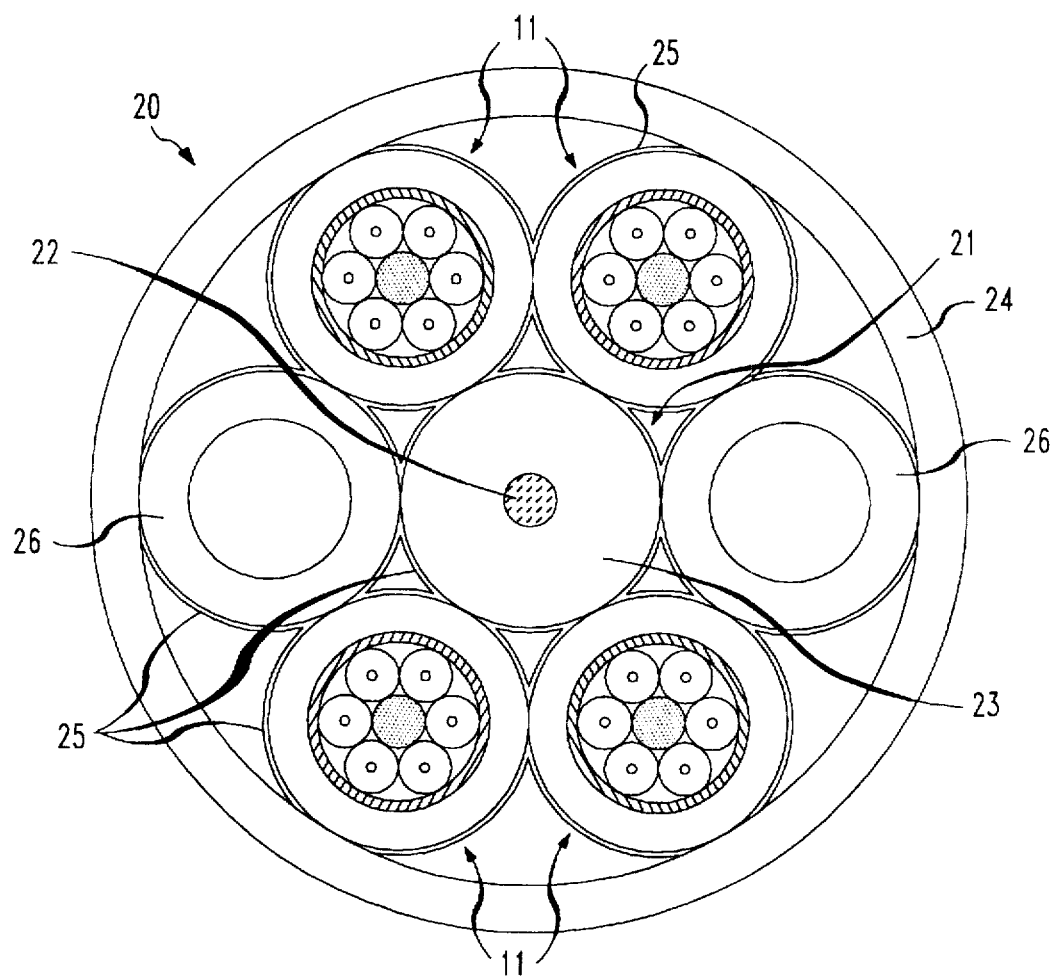
FIG. 5A is a cross-sectional view of a main cable in accordance with this invention including spacers and component cables of FIGS. 2A and 2B.

FIG. 5A is a second preferred embodiment of the cable 20 using the component cables 11 of FIGS. 2A and 2B. In FIG. 5A, two spacers 26 are situated on the right- and left-hand sides of the central strength member 21. Each spacer 26 preferably has a tube-like configuration with a radial thickness of about 0.030 inches. The spacers 26 preferably contact the central strength member 21 and respective upper and Lower component cables 11 so that the spacers 26, component cables 11 and the central strength member 21 have a mutually supporting configuration. Alternatively, one or more of the strength member 21, the component cables 11 and the spacers 26 can be spaced from each other to a degree, and yet be positioned so as to restrict the freedom of movement of neighboring component cables 11, spacer(s) 26 and/or the strength member 21. The spacers 26 are preferably elongated tubes made from plastic material such as PVC. Similarly to the cable 20 of FIGS. 3A and 3B, the cable 20 of FIGS. 5A and 5B includes an outer jacket 24 of plastic material such as PVC that encloses and holds together the strength member 21, the component cables 11 and the spacers 26. Preferably, the component cables 11 and the spacers 26 are twisted about the central strength member 21 in a reverse-oscillated lay which is held and maintained by friction exerted by the outer surface of the strength member 21 and the inner surface of the outer jacket 24, against the component cables 11 and the spacers 26. As previously explained with respect to the first embodiment of the cable 20 of FIGS. 3A and 3B, these frictional forces can be so strong that stripping of the outer jacket 24 is rendered difficult. Accordingly, the slick substance 25 can be applied to outside surfaces of the component cables 11, the spacers 26, and/or the inner surface of the jacket 24 in an amount sufficient to allow the jacket 24 to be slid off of the component cables 11 and the spacers 26 when stripping the outer jacket 24 from the cable 20, and yet sufficiently small in amount that the preferred reverse-oscillated lay of the component cables 11 and the spacers 26 is not lost by the torsional forces of the twisted component cable(s) 11 and spacer(s) 26, overcoming frictional forces applied on the component cable(s) 11 and the spacers 26, by the inner surface of the jacket 24 and outer surface of the strength member 21.

Also, if friction between the inner surface of the jacket 24, the outer surface(s) of the component cable(s) 11 and/or the outer surface of the strength member 21 is so great as to impede the flexibility of the cable 20 by preventing movement of the component cable(s) 11, the spacer(s) 26 and the strength member 21 relative to one another along respective longitudinal axes, the slick substance 25 can be applied to the inside surface of the jacket 24, the outside surfaces of the component cable(s) 11 and the spacer(s) 26 and/or the strength member 21 as needed to achieve the desired degree of flexibility for the cable 20. Of course, while achieving the desired degree of flexibility of the cable 20, the slick substance 25 should not be applied in an amount so great that the torsional forces of the component cable(s) 11 and the spacer(s) 26 overcome the frictional forces between the inner surface of the jacket 24, and the outer surfaces of the component cable(s) 11 and the strength member 21, so that the reverse-oscillated lay of the component cable(s) 11 and the spacer(s) 26 is not lost.

Figure 5B:
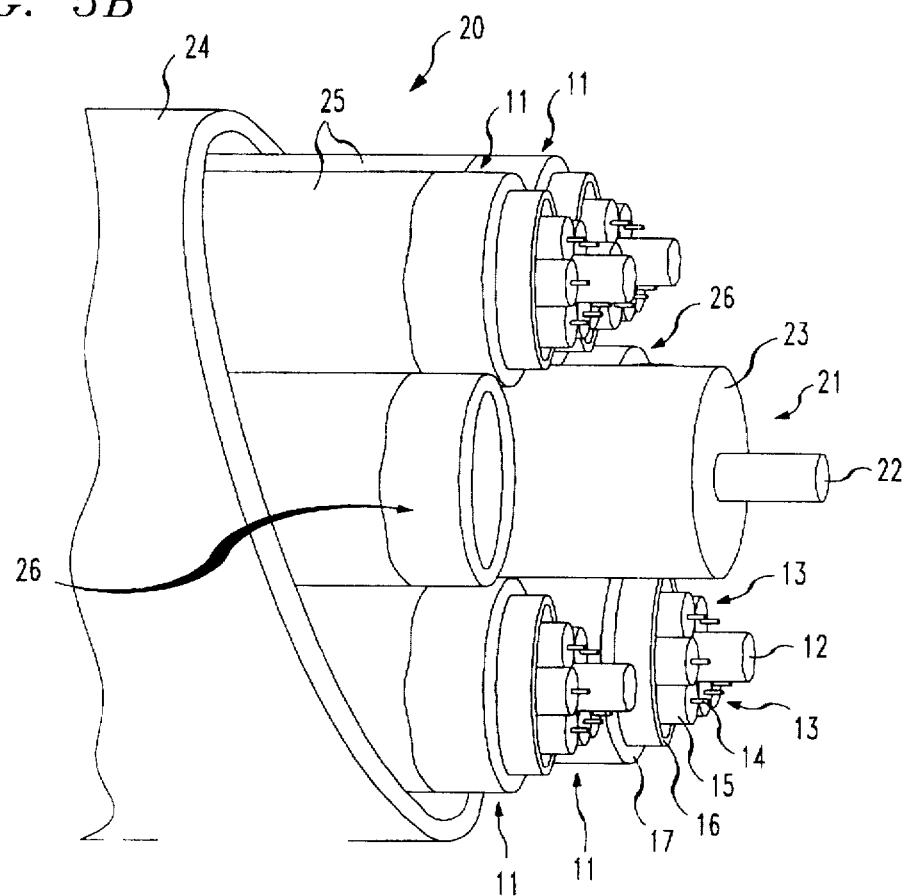
FIG. 5B is a telescoping perspective cutaway view of the main cable of FIG. 5A.

FIG. 5B is a telescoping perspective cutaway view of the cable 20 of FIG. 5A. FIG. 5B is included in this document to provide an understanding of the three-dimensional configuration of the cable 20 of FIG. 5A.

The manner of using the cable 30 of FIGS. 5A and 5B is similar to that described previously with respect to the cable 30 of FIGS. 3A and 3B, except that the extraneous lengths of the spacer(s) 26 are preferably cut and disposed of when stripping the cable 40.

In comparing the first embodiment of the cable 20 of FIGS. 3A and 3B with the second embodiment of the cable 20 of FIGS. 5A and 5B, it will be appreciated that the arrangement of the component cables 11, the strength member 21 and the outer jacket 24 in FIGS. 3A and 3B, is similar to the arrangement of the component cables 11, the spacers 26, the strength member 21 and the jacket 24 in FIGS. 5A and 5B. Thus, the cable 20 can be manufactured with a wide range of optical fiber counts without significant restructuring of the equipment used to manufacture the cable 20 by adjusting the number of component cable(s) 11, or equivalently the number of spacer(s) 26, used in the cable 20. For example, to change the manufacturing set-up used to make the 36-fiber count cable 20 of FIGS. 3A and 3B, to one capable of making the 24 optical fiber count cable 20 of FIGS. 5A and 5B, two component cables are replaced with two plastic spacers 26, and the manufacturing equipment need not be changed. Thus, by inserting or omitting component cable(s) 11 and spacer(s) 26, the manufacturing equipment used to make the cable 20 can be modified quickly, simply and inexpensively to produce cables with optical fiber counts meeting a particular customer's needs, and the cable 20 can be quickly manufactured for the customers.

Figure 6A:
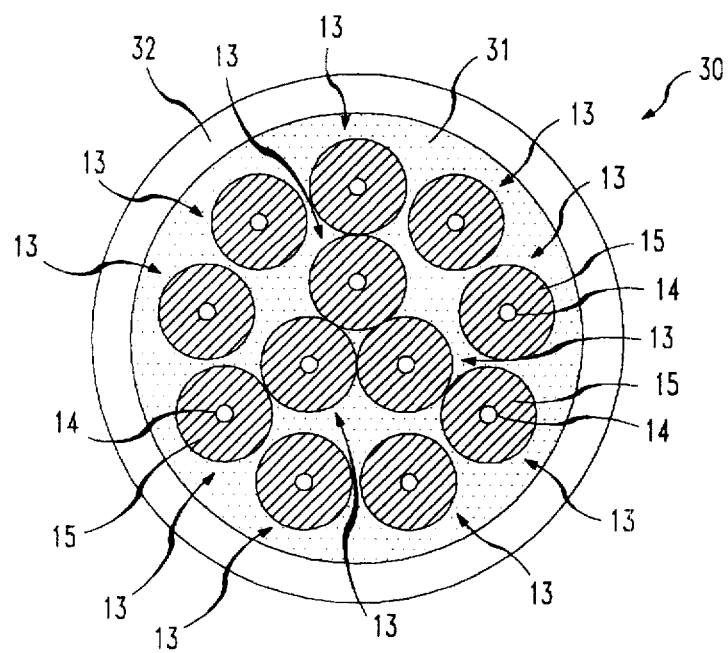
FIG. 6A is a cross-sectional view of a second embodiment of a component cable in accordance with this invention.

FIG. 6A is a cross-sectional view of a component cable 30 in accordance with this invention. Just as the component cable 11 is the basic unit used in the cables 20, the component cable 30 is the basic unit used in the inventive cables of FIGS. 7A, 7B, 8A, 8B, 9A and 9B to be described subsequently in this document. The component cable 30 includes a plurality, preferably twelve, buffered optical fibers 13 with respective optical fibers 14 and buffers 15. The buffered optical fibers 13 are embedded in aramid fibers 31 disposed approximately parallel with the longitudinal axes of the buffered optical fibers 13. Preferably, the aramid fibers 31 are composed of a material such as Kevlar™. A jacket 32 contacts the aramid fibers 31 and surrounds and encloses the aramid fibers 31 and the optical fibers 13. Preferably, the jacket 32 is tube-like and formed of plastic material such as PVC with a radial thickness of about 0.020 inches; for example. Also preferred, the component cable 30 measures about 0.200 inches in diameter, and thus is relatively compact for the number of optical fibers 13 it contains.

The component cable 30 of this invention can be readily made using conventional devices and techniques, for example. More specifically, the buffered optical fibers 13 can be unwound from respective spools and advanced together. Aramid fibers 31 can be unwound in yarn strands from respective spools so that the yarn is disposed between some or all of the advancing buffered optical fibers 13, and also disposed about the buffered optical fibers 13 so that the buffered optical fibers 13 are embedded in the aramid fibers 31. The buffered optical fibers 13 and the aramid fibers 31 are advanced together through an extruder die to extrude the plastic jacket 32 about the aramid fibers 31, to form the component cable 30 of this invention.

Figure 6B:
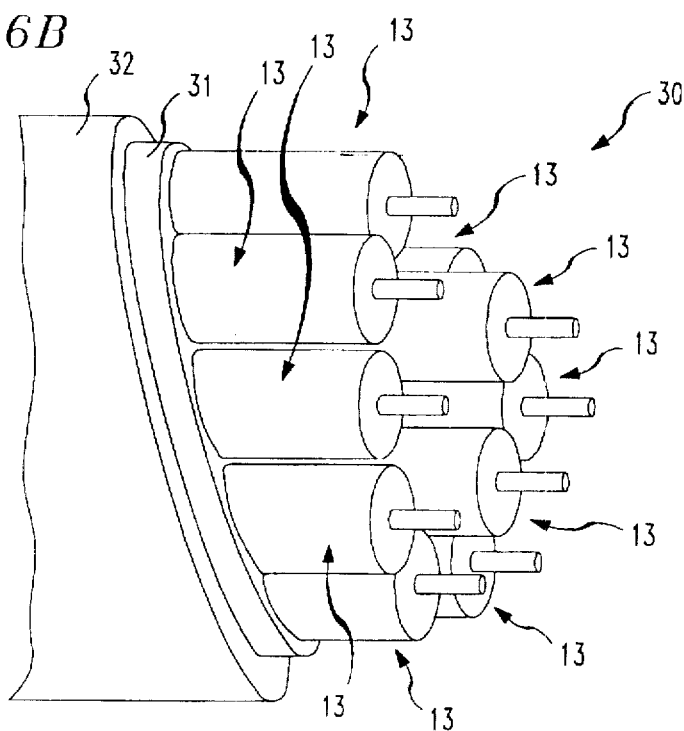
FIG. 6B is a telescoping perspective cutaway view of the component cable of FIG. 6A.

FIG. 6B is a telescoping perspective cutaway view of the component cable 30. The view of FIG. 6B is included in this document to provide an appreciation of the three-dimensional configuration and arrangement of the component cable 30.

Figure 7A:
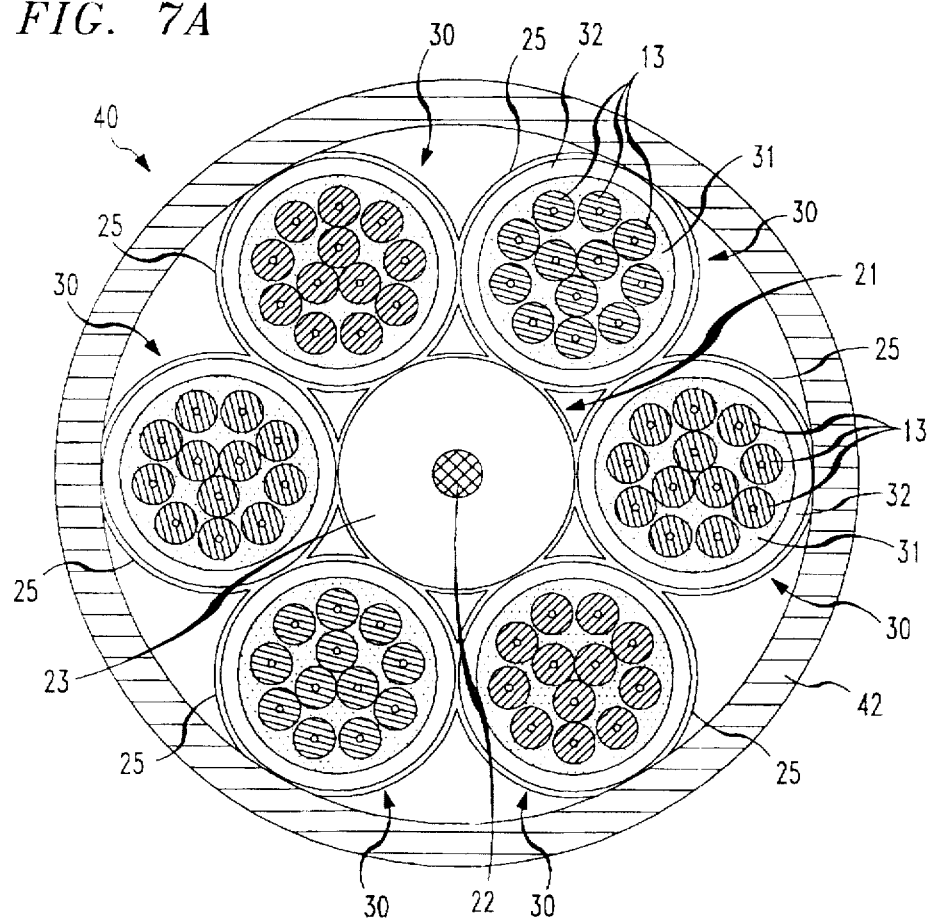
FIG. 7A is a cross-sectional view of a main cable of this invention incorporating component cables of FIGS. 6A and 6B.

FIG. 7A is a cross-sectional diagram of a cable 40 in accordance with a second embodiment of this invention. At its core, the cable 40 has an elongated central strength member 21 including a glass rod 22 and plastic layer 23, which is essentially the same element as described with respect to FIG. 3A. In FIG. 7A, six component cables 30 of approximately the same diameter as that of the strength member 21, are wound about the strength member 21 in a reverse-oscillated lay. Because the strength member 21 and the component cables 30 are roughly the same size in diameter, each component cable 30 is supported by two neighboring component cables 30 and the strength member 21. Thus, the cable 40 has a uniform, sturdy configuration. An outer jacket 42, preferably tube-like in configurations encloses the strength member 21, and the component cables 30. Preferably, the outer jacket 42 is formed of a plastic material such as PVC with a radial thickness of about 0.030 inches, for example. As with the cable 20 of FIGS. 3A and 3B, the slick substance 25 composed of powdered talc, for example, can be applied to outer surfaces of the component cables 30, the strength member 21 and/or the inner surface of the outer jacket 42 to aid in stripping the jacket 42 off of the component cables 30, and to enhance the flexibility of the cable 40.

Figure 7B:
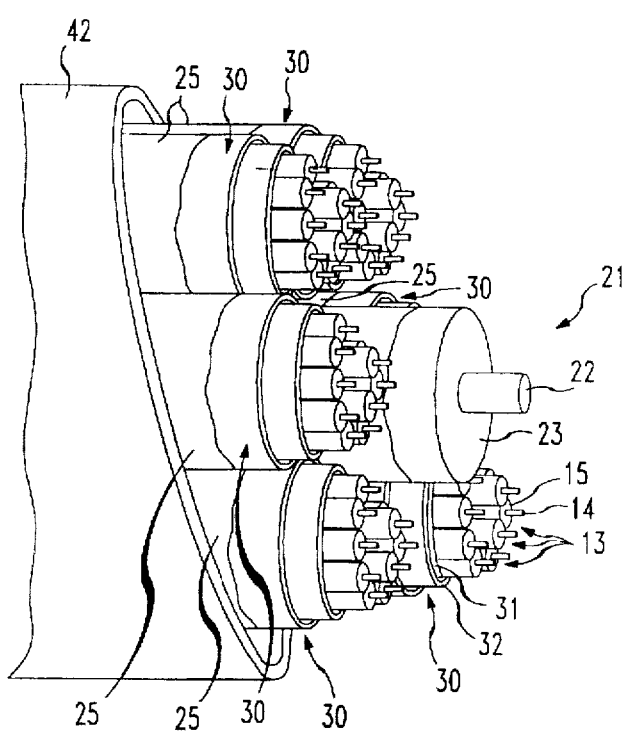
FIG. 7B is a telescoping perspective cutaway view of the main cable of FIG. 7A.

FIG. 7B is a telescoping perspective cutaway view of the cable 40 disclosed in FIG. 7A. The view of FIG. 7B is provided for an understanding of the three-dimensional configuration of the cable 40 of FIG. 7B.

Figure 8A:
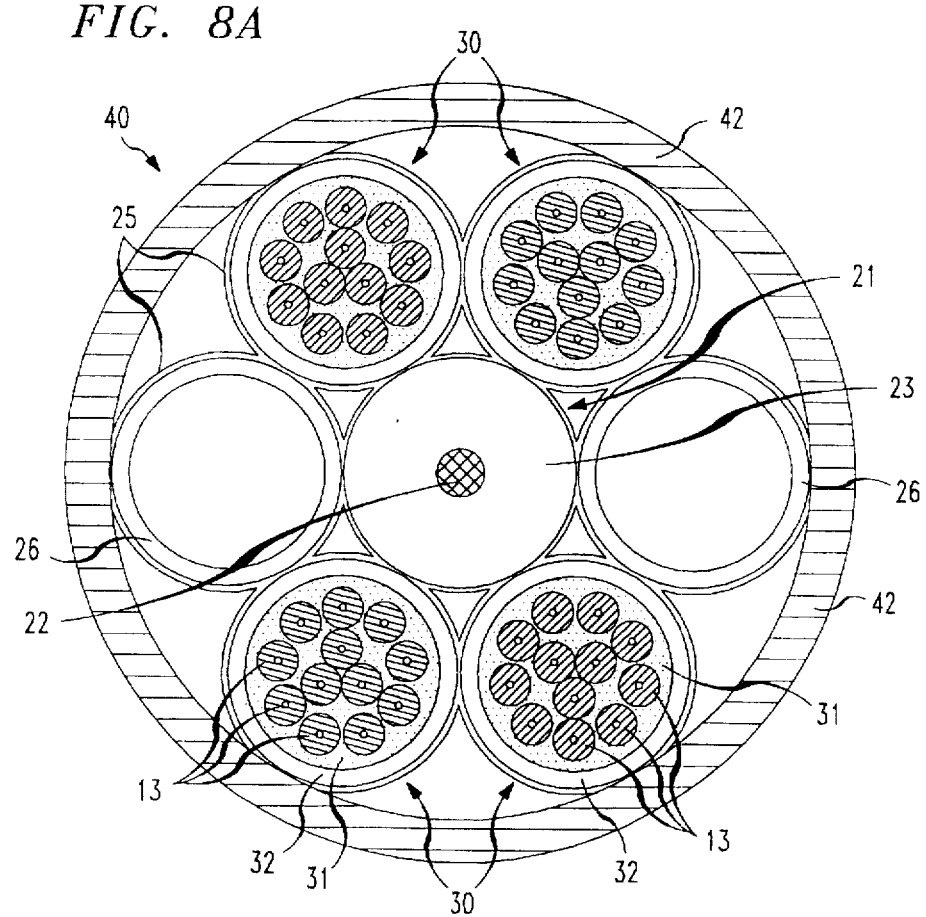
FIG. 8A is a cross-sectional view of a main cable in accordance with this invention including spacers and component cables of FIGS. 6A and 6B.

FIG. 8A is a cross-sectional view of a second embodiment of the cable 40. In the cable 40 of FIG. 8A, four component cables 30, two on each of the upper and lower sides of the strength member 21, and two spacers 26, one on respective right and left sides of the strength member 21 in the cross-section of FIG. 8A, are wound in reverse-oscillated lay about the strength member 21. The spacers 26 are, like the component cables 30, about 0.200 inches in diameter, but have a radial thickness of about 0.030 inches to approximately match the degree of flexibility of the component cables 30. The outer jacket 42 surrounds the strength member 21, the spacers 26 and the component cables 30. To ease stripping of the outer jacket 24 or to increase the flexibility of the cable 40, the substance 25 can be applied to the outside of the spacers 26, the component cables 30 and the strength member 21 and/or to the inside of the outer jacket 42.

Figure 8B:
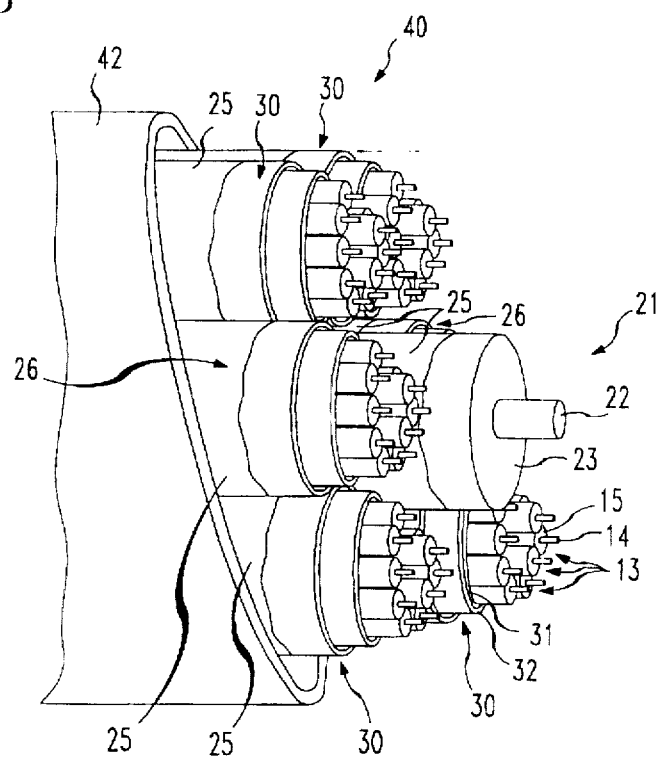
FIG. 8B is a telescoping perspective cutaway view of the main cable of FIG. 8A.

In comparing the first and second embodiments of the cable 40 shown in FIGS. 7A and 8A, it will be appreciated that the arrangement of the component cables 30 and the spacers 26 about the strength member 21 in FIG. 8A is similar to the arrangement of the component cables 30 about the strength member 21 in FIG. 7A. As previously explained with respect to FIGS. 3A, 3B and 5A, 5B, the similarity in arrangements of the first and second embodiments of the cables 40 results in a minimum of modification of the equipment needed to manufacture the cables 40 when changing the optical fiber count of the cable 40 to be manufactured. Therefore, by adjusting the number of spacers) 26 and component cable(s) 30 used in the cable 40, the cable 40 can be manufactured with optical fiber counts of twelve, twenty-four, thirty-six, forty-eight, sixty or seventy-two optical fibers with very little modification of the manufacturing equipment FIG. 8B shows the second embodiment of the cable 40 in a telescoping perspective cutaway view. FIG. 8B provides an appreciation of the three-dimensional configuration of the second embodiment of the cable 40.

The cables 40 of this invention can be installed and used in a manner similar to that previously described for the cables 30. Likewise, extraneous lengths of the spacer(s) 26 can be cut and disposed of so that the extraneous lengths of the spacer(s) 26 will not interfere with splicing of a component cable 30 to another cable, or when installing and running a cable 30 to a location remote from the stripped portion of the cable 40. The jacket 32 in each of the component cables 30 in a cable 40 can be pigmented with a color, for example, to aid a service person in distinguishing each component cable 30 from others in the cable 40.

Figure 9A:
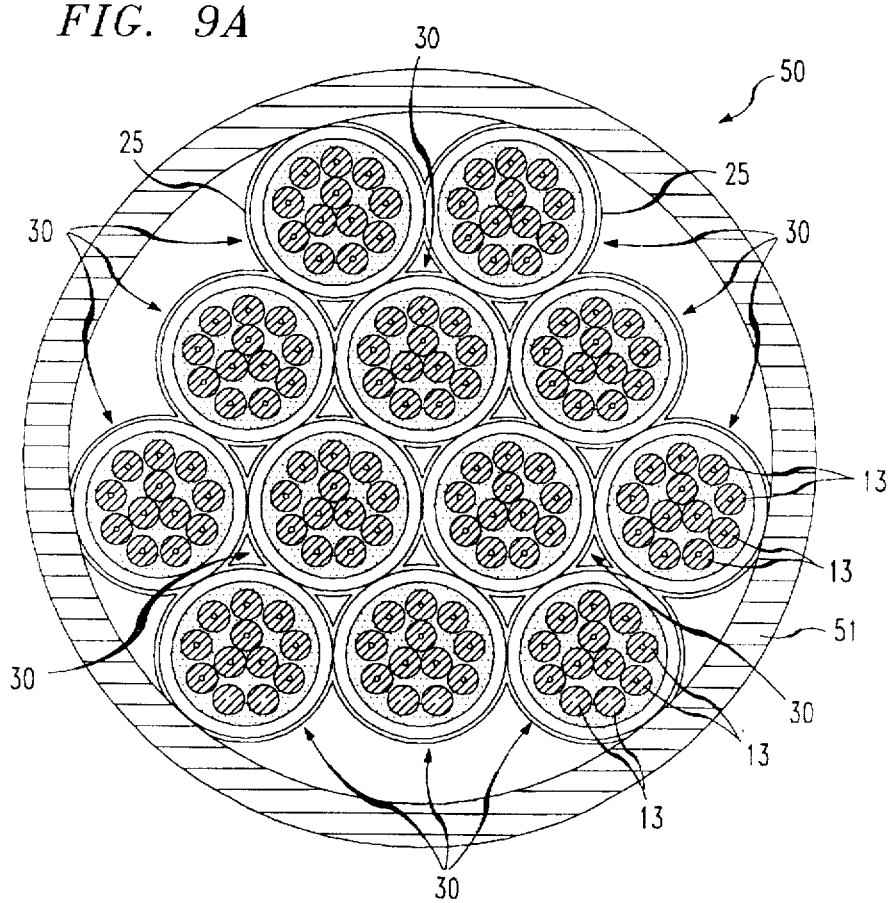
FIG. 9A is a cross-sectional view of a main cable in accordance with this invention including component cables of FIGS. 6A and 6B.

FIG. 9A is a cross-sectional view of a cable 50 in accordance with a third embodiment of this invention. The cable 50 includes a plurality of component cables 30. The component cables 30 are stacked from top to bottom in the cross-section of FIG. 9A in horizontal rows of two, three, four, and three component cables 30. Preferably, the component cables 30 have a reverse-oscillated lay along the longitudinal axis of the cable 50. An outer jacket 51, preferably tube-like in shape and formed of plastic material such as PVC with a radial thickness of about 0.035 inches, encloses and protects the component cables 30. The cable 50 is preferably about 0.880 inches in diameter. Because some of the outer surfaces of the component cables 30 contact the inner surface of the outer jacket 51, the substance 25 can be applied to the outside surfaces of the component cables 30 to reduce friction between the outer surfaces of the component cables 30 and the inner surface of the outer jacket 51 so that stripping of the outer jacket 51 will be comparatively easy to perform to improve flexibility of the cable 50. Also, the slick substance 25 can be applied to the outside surface of the component cables 30 so that the component cables 30 car slide to a degree in contact with one another along the longitudinal axis of the cable 50.

As with the second embodiments of the cables 20, 30, one or more spacers 26 (not shown in FIG. 9A) can be used to substitute for one or more component cables 30 shown in FIG. 9A without appreciably modifying the structure of the cable 50 or the equipment need to manufacture the cable 50. By including an appropriate number of the spacer(s) 26, the cable 50 can be made with an optical fiber subunit count that is any multiple from one to twelve, depending on the number of component cables 30 in the cable 50, of the twelve optical fibers in each component cable 30. In FIG. 9A, there are twelve component cables 30 having twelve optical fibers each, so that the total fiber count is 144. This is an extremely high optical fiber count for the relatively small size of the cable 50, which surpasses the fiber count of any presently-existing cable of comparable size.

Figure 9B:
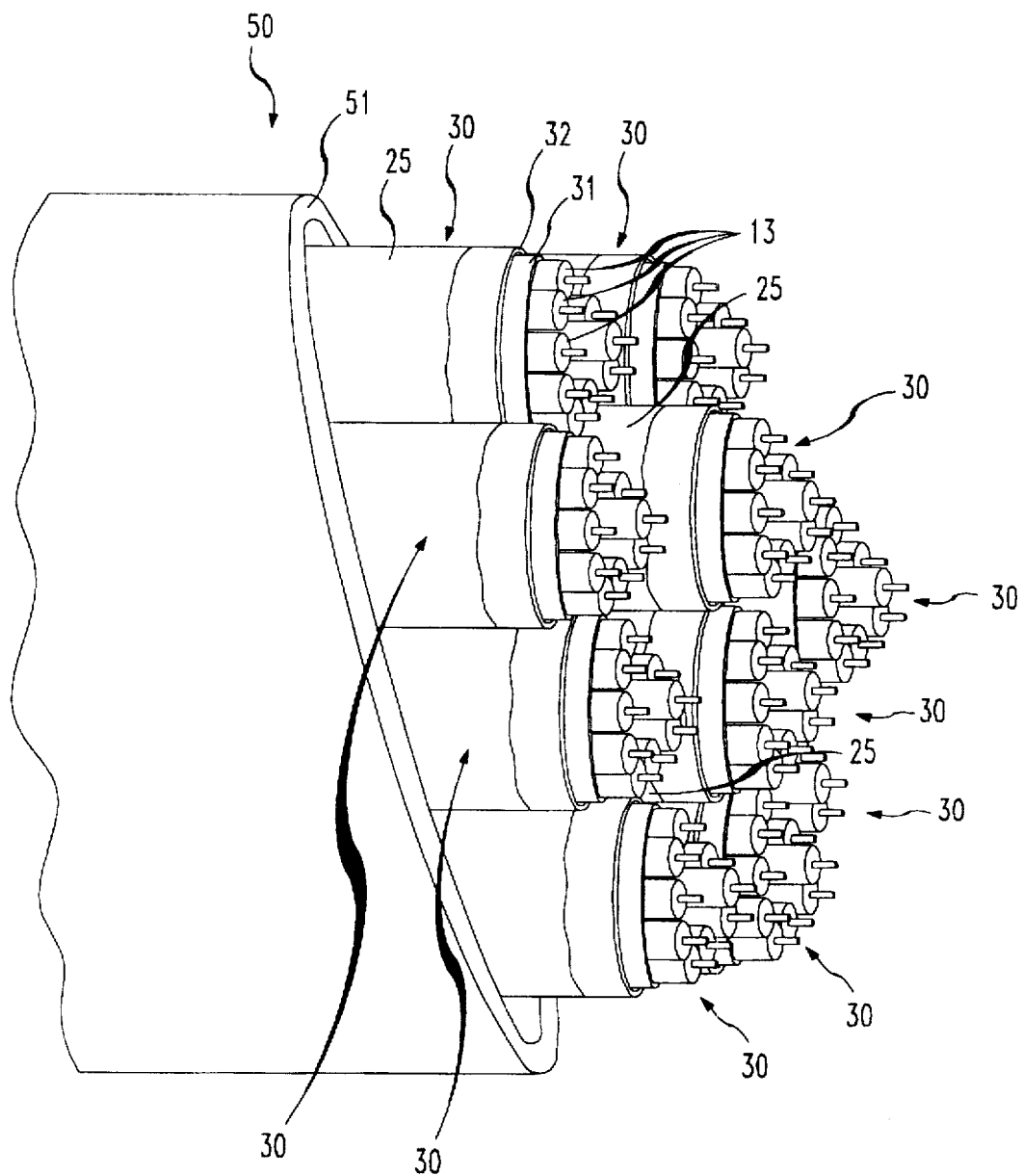
FIG. 9B is a telescoping perspective cutaway view of the main cable of FIG. 9A.

FIG. 9B is a telescoping perspective cutaway view of the cable 50 of FIG. 9A. FIG. 9B is included in this document to give an appreciation of the three-dimensional configuration of the cable 50.

The cable 50 of this invention can be used in a manner similar to that previously described with respect to the cables 30.

Figure 10:
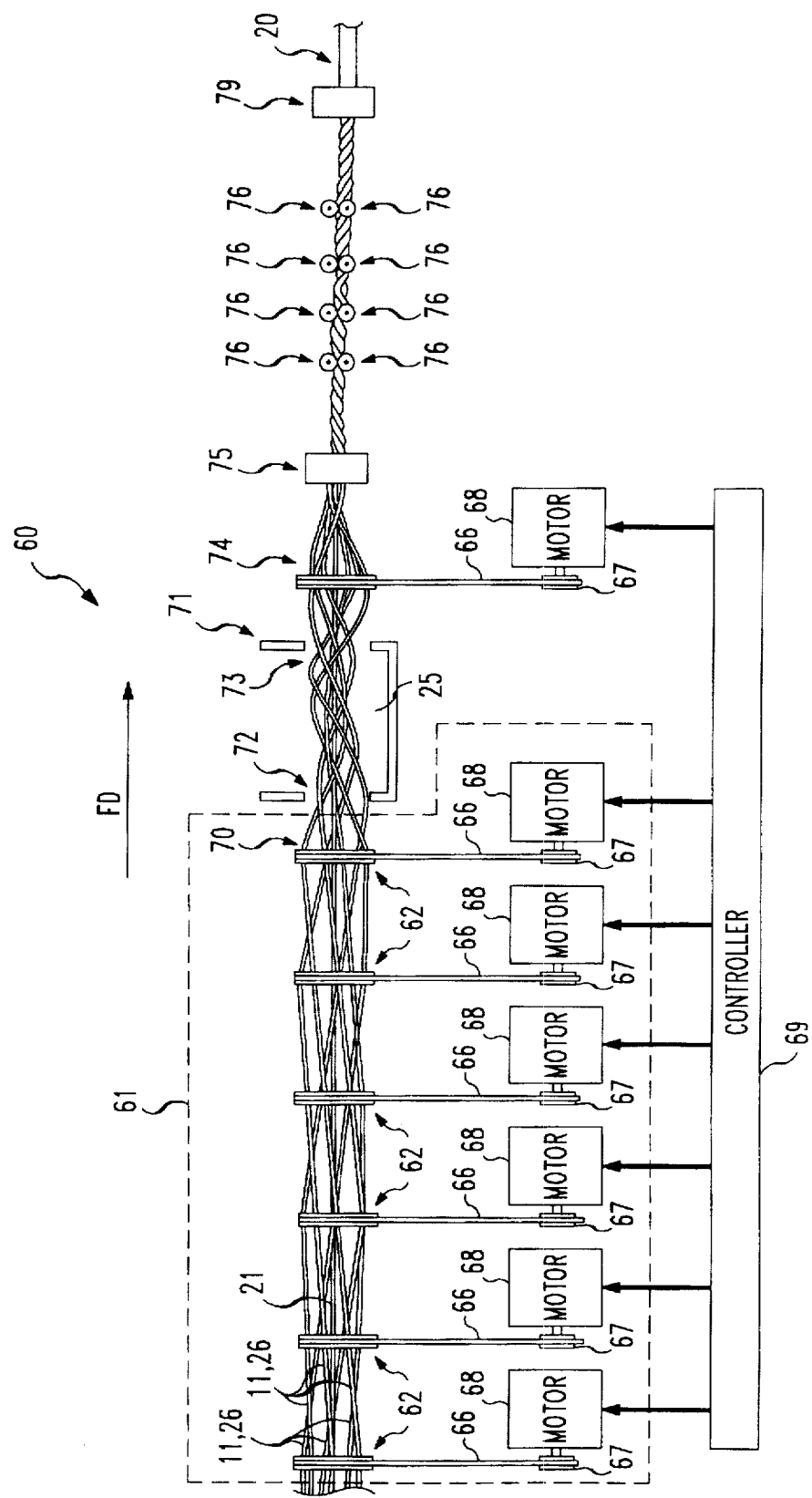
FIG. 10 is a side view of a system in accordance with this invention.

In FIG. 10, a cable manufacturing system 60 of this invention includes a pay-off system (not shown) which supplies component cables 11, spacers 26 (if any are to be used) and the strength member 21, to a reverse-oscillated lay (ROL) machine 61. The system 60 of FIG. 10 is configured to manufacture the cable 20 of this invention (shown in FIGS. 3A, 3B and 5A, 5B), although with minor modifications, the system 60 can be used to manufacture the cables 40, 50 of this invention, as will be subsequently described. Because the component cables 11 and spacers 26 are wound about the strength member 21 in a reverse-oscillated lay, the pay-off system need not be a relatively expensive planetary type in which the feed spools from which the component cable(s) 11 and spacer(s) 26 are unwound, rotate about an axis parallel to the feed direction "FD" along which the component cable(s) 11 and the spacer(s) 26 are advanced, as would be required if the component cable(s) 11 and spacer(s) 26 were wrapped in continuous respective helixes about the strength member 21. Thus, the component(s) cables 11 and the spacer(s) 26 can be fed to the ROL machine 61 from stationary spools which do not require the relatively expensive equipment needed to rotate feed spools circularly about an axis parallel with the feed direction "FD" as required in planetary feed systems. The feed system used in the system 60 of FIG. 10 can thus be a relatively inexpensive conventional stationary type of feed system.

Figure 11:
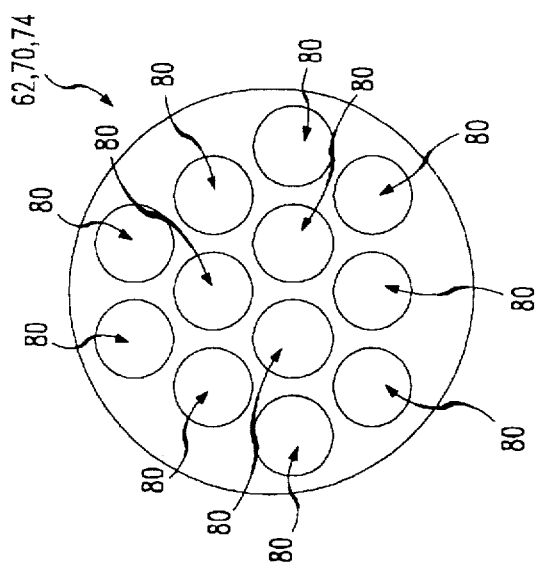
FIG. 11 is a front end view of a plate used in the reverse-oscillated lay machine of the system of this invention, to make the cables of FIGS. 3A, 3B, 5A, 5B, 7A, 7B, 8A, 8B.

The ROL machine 61 can be one of a wide variety of commercially-available machines, and includes a plurality of plates 62 which are rotatably mounted and supported in the ROL machine 61. Preferably, as shown in FIG. 11, each plate 62 includes a circular or disk member 63 defining apertures 64 which correspond in number to the total number of component cable(s) 11 and the spacer(s) 26 to be included in the cable 20. In FIG. 11, six component cable(s) 11 and spacer(s) 26 can be fed through respective apertures 64. Because each aperture 64 can receive either a component cable 11 or a spacer 26, the designation "11, 26" is used in FIG. 10 to indicate the component cable(s) 11 and spacer(s) 26 that are used to manufacture the cable 20. The apertures 64 are defined at equal angular intervals relative to a center or rotational axis of the disk member 63 that, in FIG. 11, is the geometric center of the disk member 63. At its center, the disk member 63 defines an aperture 65 through which passes the strength member 21. In the ROL machine 61, the disk member 63 can be supported by one or more bearings (not shown) coupled between the front and/or rear circumferential edges of the disk member 63, and the frame of the ROL machine 61. In FIG. 10, the plates 62 of the ROL machine 61 receive component cable(s) 11 and spacer(s) 26 through respective apertures 64, and also receive the central strength member 21 through respective apertures 65. Endless belts 66 are looped about the circumferential side edges of the plates 62, and respective drive pulleys 67. The drive pulleys 67 are mechanically coupled to and driven to rotate by respective motors 68. The motors 68 are electrically coupled to a controller 69. The controller 69 generates and outputs signals to respective motors 68 to control the direction (clockwise or counterclockwise) and speed of rotation of the motors 68, and hence also the rotation direction and speed of the plates 62. The controller 69 generates signals to control respective motors 68 to rotate the plates 62 in a predetermined phase relationship. For example, the controller 69 can control the plate 62 furthest downstream along the feed direction "FD" (this plate 62 will be referred to hereinafter as the 'exit plate 70') to rotate in a counterclockwise direction relative to the front ends of the plates 62 and the exit plate 70, for a predetermined number of rotations over a time period predetermined for the feed speed of the component cable(s) 11 and the spacer(s) 26 to the ROL machine 61 from the feed system. After the exit plate 70 is driven by the controller 69 to rotate in the counterclockwise direction for the predetermined number of revolutions of the exit plate 70, the controller 69 generates and outputs the signal to the motor 68 to reverse the rotation direction of the exit plate 70, and to control the motor 68 to rotate the exit plate 70 in the clockwise direction for the predetermined number of revolutions. The controller 69 continues to drive the exit plate 70 alternately in the clockwise and counterclockwise direction, each for the predetermined number of revolutions as long as the strength member 21 and the component cable(s) 11 and the spacer(s) 26, continue to be fed to the ROL machine 61. The rotation of the first plate 62 immediately upstream relative to the feed direction "FD" of the exit plate 70 is controlled similarly to the exit plate 70, but delayed in phase by a predetermined amount relative to the motion of the exit plate 70. The next plate 62 upstream from this plate 62, i.e., the second plate 62 upstream relative to the feed direction "FD" from the exit plate 70, is rotated in a manner similar to the plate 62 which is the first upstream of the exit plate 70 relative to the feed direction "FD", but it's delayed in phase by the predetermined amount from the first plate 62. Similarly, the third plate 62 which is the third in position upstream relative to the feed direction "FD" from the exit plate 70 is delayed by three times the predetermined phase amount from the motion of the exit plate 70. Similarly, the fourth plate 62 upstream from the exit plate 70 relative to the feed direction "FD" is delayed by four times the predetermined phase amount relative the exit plate 70, and the fifth plate 62 upstream from the exit plate 70 lags the motion of the exit plate 70 by five times the predetermined phase amount. Thus, the plates 62 are rotated by the controller 69 in a manner which twists the component cable(s) 11 and the spacer(s) 26 about the strength member 21 in a reverse-oscillated lay.

From the exit plate 70, the component cable(s) 11 and the spacer(s) 26 twisted about the strength member 21, are fed to an applicator 71 which defines entrance and exit apertures 72, 73 through which the component cable(s) 11, the spacer (s) 26 and the strength member 21 are fed along the feed direction "FD". The applicator 71 contains the slick substance 25 such as powered talc, which is applied or dusted on the component cable(s) 11, the spacer(s) 26 and the strength member 21. In accordance with this invention, to maintain the reverse-oscillated lay of the component cable(s) 11 and spacer(s) 26 about the strength member 21, a follower plate 74 is disposed downstream along the feed direction "FD" from the applicator 71. The follower plate 74 can be the same in configuration as the plates 62 (including the exit plate 70) of the ROL machine 61. Like each plate 62, the follower plate 74 is rotatably mounted to a frame (not shown) with, for example, one or more bearings attached between the front and/or rear circumferential edges of the follower plate 74, and the frame that supports the follower plate 74 in position to receive the component cable(s) 11, spacer(s) 26 and the strength member 21 from the applicator 71. The follower plate 74 can be driven by an endless belt 66 looped about the circumferential side edge of the follower plate 74 and a drive pulley 67 coupled to a motor 68. The motor 68 which drives the follower plate 74, is coupled to receive from the controller 69 the same or substantially the same control signal as that received by the motor 68 that drives the exit plate 70. Importantly, the follower plate 74 is thus driven in-phase with the exit plate 70 and so preserves the reverse-oscillated lay of the component cable(s) 11 and spacer(s) 26, about the strength member 21. In other words, the follower plate 74 prevents the component cable(s) 11 and spacer(s) 26 from untwisting in the applicator 71, a significant advantage of this invention relative to the prior art. Also, it will be appreciated that the exit plate 70 and the follower plate 74, as they rotate in-phase, cause the substance 25 to be applied to all of the component cable(s) 11 and spacer(s) 26 as they spin in contact with the substance 25. From the follower plate 74, the component cable(s) 11, the spacer(s) 26 and the strength member 21 advance to a sizing die 75 which can be of any conventional variety. The sizing die 75 defines a tapering or semi-torodial aperture which constricts the component cable(s) 11 and the spacer(s) 26 into contact with the strength member 21.

Figure 12:
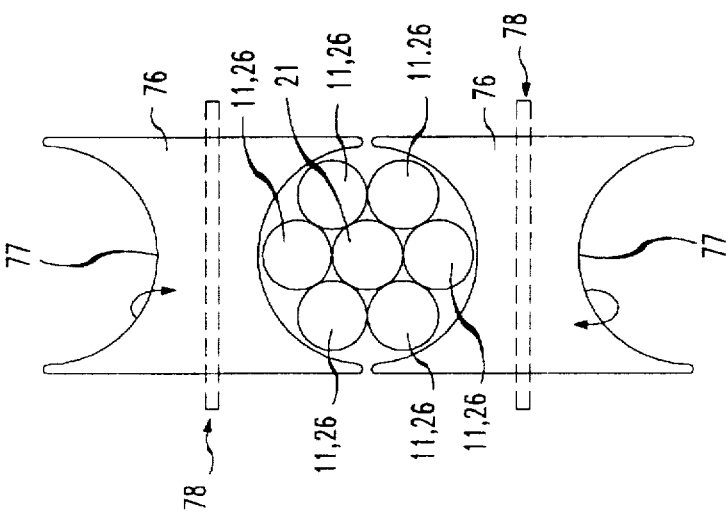
FIG. 12 is a front end view of a pair of opposing rollers in accordance with this invention, showing a cable in cross-section advancing between the rollers.

From the sizing die 75, the component cable(s) 11, the spacer(s) 26 and the strength member 21, advance along the feed direction "FD" to at least one pair of rollers 76 in accordance with this invention. The rollers 76 are supported by a frame (not shown) which holds the ends of roller axles 78 to support the rollers 76 in position to receive the component cable(s) 11, the spacer(s) 26 and the strength member 21 as they are driven along the feed direction "FD" in FIG. 10. As shown in FIG. 12, when viewed from the front (that is, looking at the rollers 76 from a perspective upstream of the rollers 76 along the feed direction "FD"), the rollers 76 have circumferential surfaces 77 which are convex and symmetrical about the respective rotational axes of the rollers 76 through which pass respective axles 78 to support the rollers 76. The component cable(s) 11, the spacer(s) 26 and the strength member 21 pass between opposing circumferential surfaces 77 of the rollers 76. The pair of rollers 76 engage with the component cable(s) 11 and the spacer(s) 26, and roll on the axles 78 as the component cable(s) 11 the spacer(s) 26 and the strength member 21, are driven along the feed direction "FD". The rollers 76 apply friction to the component cable(s) 11 and the spacer(s) 26 that is sufficient to prevent the component cable(s) 11 and the spacer(s) 26 from untwisting and losing their reverse-oscillated lay. The rollers 76 hold the reverse-oscillated lay of the component cable(s) 11 and the spacer(s) 26 about the strength member 21, until they are fed to a die 79 which extrudes molten plastic material 24 about the component cable(s) 11 and the spacer(s) 26. When cooled, the friction between the jacket 24 and the component cable(s) 11 and spacer(s) 26, is sufficient to hold the reverse-oscillated lay of the component cable(s) 11 and the spacer(s) 26 even with the application of the substance 25 thereon. The cable 20 is advanced along the feed direction "FD" in FIG. 10 by a motor (not shown) situated downstream of the die 79 relative to the feed direction "FD", that engages with the cable 20 and pulls the component cable(s) 11, the spacer(s) 26 and the strength member 21 from the feed system, through the ROL machine 61, the applicator 71, the follower plate 74, the rollers 76 and the die 79.

The system 60 can be readily modified to manufacture the cables 40 of FIGS. 7A, 7B, and 8A, 8B. Specifically, the component cables 30 can be threaded from stationary feed spools, for example, through respective apertures 64 in the plates 62. The component cable(s) 30, the spacer(s) 26 and the strength member 21 are advanced along feed direction "FD" through the apertures 64, 65 of the plates 62, 70 of the ROL machine 61, through the entrance and exit apertures 72, 73 in the applicator 71, and further through respective apertures 64, 65 defined in the follower slate 74. The component cable(s) 30, the spacer(s) 26, and the strength member 21, are also fed along the feed direction "FD" through the sizing die 75 and the pair(s) of rollers 76 to the extruder die 79 for extrusion of molten plastic material to form the outer jacket 42 of the cable 40.

Figure 13:
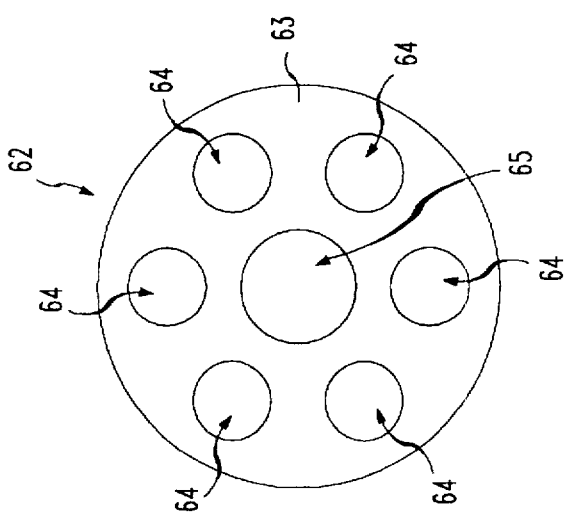
FIG. 13 is a front end view of a plate used in the reverse-oscillated lay machine of the system of this invention, to make the cable of FIGS. 9A, 9B.

The system 60 can also be readily modified to manufacture the cable 50. Specifically, the plate 62, the exit plate 70 and the follower plate 74 are configured as shown in FIG. 13 to define a plurality of apertures 80, preferably twelve, through which are fed respective component cables 30. In other respects, the structure and operation of the system 60 used to make the cable 50, is similar to that used to make the cables 20.

Although the invention has been described with specific illustrations and embodiments, it will be clear to those of ordinary skill in the art that various modifications may be made therein without departing from the spirit and scope of the invention as outlined in the following claims. For example, the cables 20, 40 and 50 can include aramid ripcords like those of the prior art cable of FIG. 1, for example, with trivial modification of the system 60 of FIGS. 10-13.

We claim:

1. An apparatus comprising:
  at least one component cable including
    an elongated central aramid yarn member;
    a plurality of individually buffered optical fibers arranged about and in contact with the aramid yarn member;
    an aramid yarn layer surrounding and in contact with the buffered optical fibers; and
    a plastic jacket surrounding and in contact with the aramid yarn layer.

2. An apparatus as claimed in claim 1, wherein the yarn member is composed of Kevlar™.

3. An apparatus as claimed in claim 1, wherein at least one of the optical fibers is buffered with at least one respective plastic layer surrounding the optical fiber.

4. An apparatus as claimed in claim 1, wherein at least one optical fiber is buffered with a first plastic layer surrounding and in contact with the optical fiber, and a second plastic layer surrounding and in contact with the first plastic layer.

5. An apparatus as claimed in claim 1, wherein the buffered optical fibers are helically wound on the yarn member.

6. An apparatus as claimed in claim 1, wherein the aramid yarn layer is composed of Kevlar™.

7. An apparatus as claimed in claim 1, wherein the plastic jacket is composed of thermoplastic material.

8. An apparatus as claimed in claim 1 further comprising:
  an elongated central strength member with a plurality of the component cables surrounding and in contact with the strength member; and
  an outer jacket surrounding and in contact with the plurality of the component cables.

9. An apparatus as claimed in claim 8, wherein the strength member includes
  an elongated glass rod, and
  a plastic layer surrounding and in contact with the glass rod.

10. An apparatus as claimed in claim 8, wherein the component cables are situated on the strength member with a reverse oscillated lay.

11. An apparatus as claimed in claim 8, wherein the outer jacket is composed of thermoplastic material.

12. An apparatus as claimed in claim 8, further comprising:
  at least one spacer in contact the strength member and situated between two component cables.

13. An apparatus as claimed in claim 8, further comprising:
  a slick substance disposed between the outer jacket and the component cable.

14. An apparatus as claimed in claim 8, wherein the component cables are colored to distinguish the component cables from one another.

15. An apparatus comprising:
  an elongated central strength member with a plurality of the component cables surrounding and in contact with the strength member;
  at least one component cable including aramid fibers;
    a plurality of individually buffered optical fibers embedded in the aramid fibers;
    a plastic jacket surrounding the buffered optical fibers and the aramid fibers and in contact with a portion of the aramid fibers.

16. An apparatus as claimed in claim 15, wherein at least one of the buffered optical fibers is buffered with at least one respective plastic layer surrounding the optical fiber.

17. An apparatus as claimed in claim 15, wherein at least one optical fiber is buffered with a first plastic layer surrounding and in contact with the optical fiber, and a second plastic layer surrounding and in contact with the first plastic layer.

18. An apparatus as claimed in claim 15, wherein the buffered optical fibers are helically wound.

19. An apparatus as claimed in claim 15, wherein the aramid fibers are composed of Kevlar™.

20. An apparatus as claimed in claim 15, wherein the plastic jacket is composed of thermoplastic material.

21. An apparatus as claimed in claim 15, further comprising:
  an outer jacket surrounding and in contact with the plurality of component cables.

22. An apparatus as claimed in claim 21, wherein the strength member includes
  an elongated glass rod, and
  a plastic layer surrounding and in contact with the glass rod.

23. An apparatus as claimed in claim 21, wherein the component cables are situated on the strength member with a reverse oscillated lay.

24. An apparatus as claimed in claim 21, wherein the outer jacket is composed of thermoplastic material.

25. An apparatus as claimed in claim 21, further comprising:
  at least one spacer in contact the strength member and situated between two component cables.

26. An apparatus as claimed in claim 21, further comprising:
  a slick substance contacting at least the inside of the outer jacket and at least one component cable.

27. A system receiving a plurality of component cables, the system comprising:
  a reverse oscillated lay (ROL) machine receiving the component cables approximately along longitudinal axes thereof, the ROL machine having a plurality of plates including an exit plate, the plates defining respective apertures through which the component cables pass, the plates oscillating about respective axes in a predetermined phase relationship to twist the component cables in ROL, the exit plate outputting the ROL component cables;

an applicator containing a slick substance, the applicator receiving the ROL component cables and applying the slick substance to the ROL component cables; and a follower plate having apertures through which respective component cables pass, oscillating in phase with the exit plate of the ROL machine.

28. A system as claimed in claim 27, further comprising:

at least one pair of rollers having respective circumferential convex surfaces arranged in opposition, the rollers receiving the ROL component cables between the convex surfaces and maintaining the ROL of the component cables.

* * * * *